July 16, 1929.  J. R. METCALF  1,720,963
COMPASS COURSE FINDER
Filed Feb. 20, 1924

Inventor:-
John R. Metcalfe
By N. P. Lind
Attorney

Patented July 16, 1929.

1,720,963

UNITED STATES PATENT OFFICE.

JOHN R. METCALF, OF ERIE, PENNSYLVANIA.

COMPASS COURSE FINDER.

Application filed February 20, 1924. Serial No. 693,995.

This invention is designed to facilitate the finding of corrected compass bearings from uncorrected magnetic or true bearings and to save computation in the finding of such courses, or the reverse.

In the ordinary practice compass bearings are found from magnetic or true bearings by the use of the Napier diagram or by the use of a compass course diagram having arranged thereon an inner compass card and an outer inverted compass card on which corresponding bearings are shown opposite each other on each compass card. In the use of the latter, corrected compass bearings for certain uncorrected magnetic or true bearings are indicated after existing errors due to deviation and variation have been corrected for in each case by drawing connecting lines from the uncorrected magnetic or true bearing in question on one of the compass cards to the corresponding corrected compass bearing in each case on the other compass card. The finding of corrected compass bearings for uncorrected magnetic or true bearings, or the reverse of this, not so indicated involves a mathematical calculation or the use of proportional dividers, in making which computation errors are very easily made. There are other methods of determining corrected compass bearings, all of which however, involve the liability of making errors.

In carrying out my invention I preferably provide a straight-edge device which has three swinging blades, the two main blades 5 and 4 of which may be placed with the proper edges A and B coincident with two of the connecting lines and the third, or indicator, blade 6 swung so that the indicator line C thereof passes over the uncorrected magnetic or true bearing in question as indicated on the proper one of the two compass cards and under the indicator line on the other of the two compass cards will immediately be indicated the corresponding corrected compass bearing, or the reverse of this.

The invention is illustrated in the accompanying drawings as follows:—

Fig. 2 is a plan view of the indicator swinging blade 6.

Fig. 3 is a plan view of one of the main swinging blades 5.

Fig. 4 is an end view of the same.

Fig. 5 is a plan view of the main blade 4.

Fig. 6 is an end view of the same.

Fig. 7 is a side elevation of the assembled straight-edge device.

Figure 1:
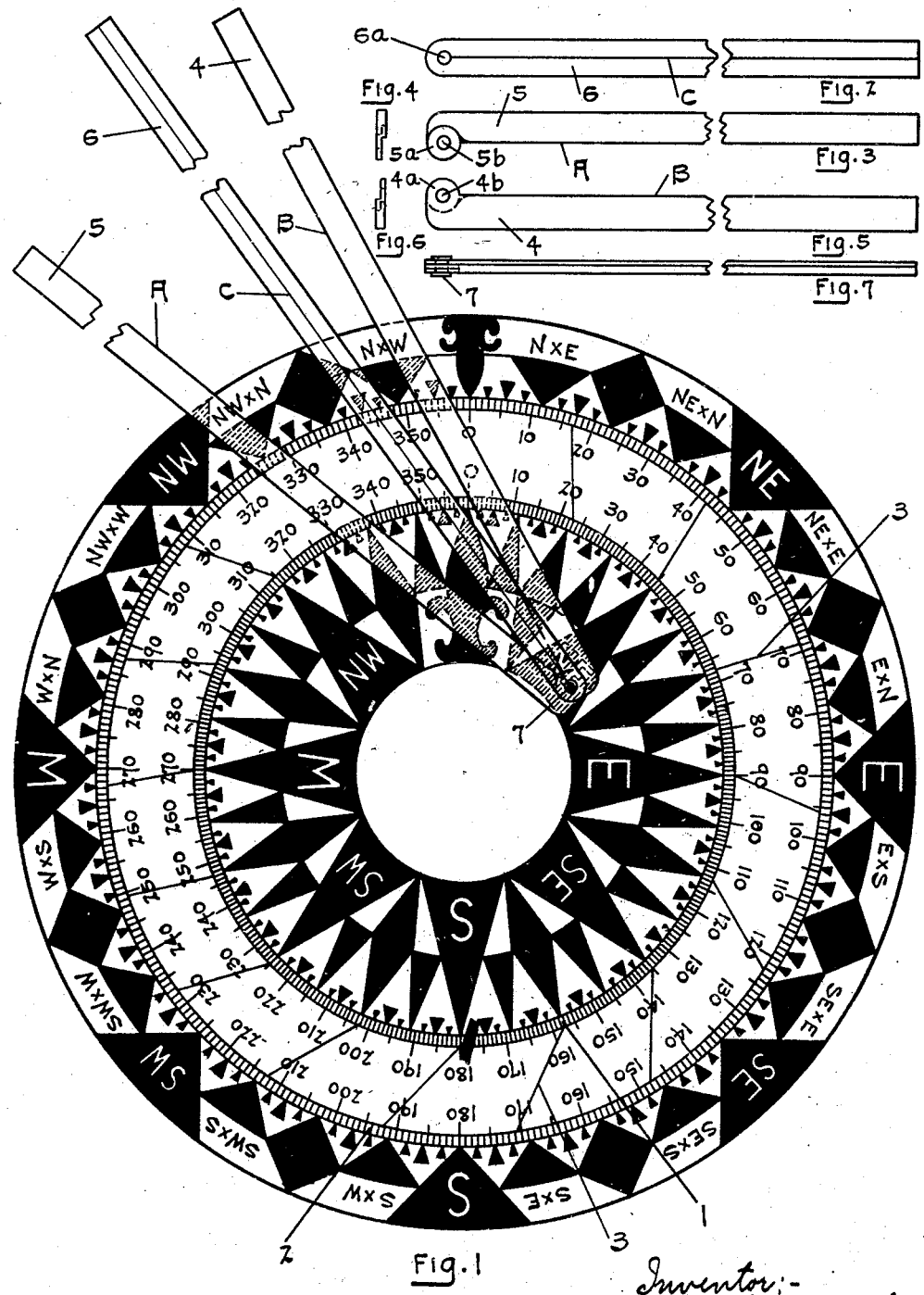
Fig. 1 shows a plan view of the compass course card with the straight-edge device in place thereon.

1 marks the inner compass card and 2 the outer inverted compass card. These have the usual compass points, with the usual scale of degrees arranged around each card so that corresponding bearings are opposite on each card. Between these compass cards are drawn connecting lines 3 joining various uncorrected magnetic or true bearings on one of the cards with corresponding corrected compass bearings on the other compass card, these compass bearings representing in each case the corresponding magnetic or true bearings corrected for the deviation and variation applying thereto, the deviation and variation in each case having been previously found. This compass course diagram so filled out with these connecting lines is in accordance with the usual practice when other diagrams of similar design are used.

I have provided the blades of the straight-edge device with the side projections $4^a$ and $5^a$ having pivot openings $4^b$ and $5^b$, the centers of these openings being in alinement with the straight edges A and B on the main blades 5 and 4. The indicator blade 6 has a pivot opening $6^a$ and is preferably made of transparent material. It has the indicator line C drawn thereon from the center of the pivot opening $6^a$ outwardly. The three blades are secured together by a pivot pin 7 so that the edges A, B and the line C meet at and swing about a common pivot point.

In using the straight edge device the straight edges A and B are manipulated so as to bring each in coincidence with one of the connecting lines 3. The line C is then brought over any point on the proper compass card indicating an uncorrected bearing in the direction of which it is desired to proceed, and the point on the outer inverted compass card lying beneath the line C is then observed and this gives the corresponding corrected compass bearing, which is the course to be steered by the compass for which the particular compass course diagram used has been calculated and provided with lines in accordance with such calculation. Thus the desired corrected compass course for this particular uncorrected bearing has been found and the compass errors on this bearing have been compensated for without involving any other computation and the liability of error is practically eliminated.

It will further be understood that this device is applicable to the determining of uncorrected magnetic or true bearings from corrected compass bearings. This can be done by simply placing the indicator blade over the proper corrected compass bearing on the proper compass card and reading the corresponding uncorrected magnetic or true bearing on the other compass card.

While I have shown as a preferable construction a straight-edge device having three blades my invention may be practiced with two blades by placing the two blades in coincidence with the two proper connecting lines, thus establishing the pivotal center. Then by holding one of the blades so as to retain the established pivotal center the other blade may be swung to another uncorrected magnetic or true bearing on the proper one of the two compass cards and the corresponding corrected compass bearing will be read on the other compass card, or the reverse of this, thus substituting the edge of the moving blade for the indicator line on the third blade shown in the specific exemplification of my invention.

What I claim as new is:—

1. In a compass course finder, the combination of an annular compass course diagram having separated outer and inner degree scales affording means of locating two uncorrected points on one scale and the two corresponding corrected points on the other scale; and a straight-edge device comprising two blades swinging from a common center, each of said blades being adapted to aline radially from the common center in coincidence with the intersection of two lines each joining an uncorrected bearing on one scale for which errors have been determined with a corresponding corrected compass bearing on the other scale, one of said blades being rotatable on said center over said scales and indicating, when so swung over an uncorrected bearing on the one scale a corresponding corrected bearing on the other scale.

2. In a compass course finder, the combination of an annular compass course diagram having separated outer and inner degree scales affording means of locating two uncorrected points on one scale and the two corresponding corrected points on the other scale; and a straight-edge device having three blades swinging from a common center, each of two of said blades being adapted to aline radially from the common center in coincidence with the intersection of two lines each joining an uncorrected bearing on one scale for which errors have been determined with a corresponding corrected compass bearing on the other scale and the third of said blades being adapted to be swung about said intersection over said scales and when so swung over an uncorrected bearing on one scale indicating a corresponding corrected compass bearing on the other scale.

3. In a compass course finder, the combination of an annular compass course diagram having separated outer and inner degree scales having a plurality of lines therebetween, each connecting an uncorrected bearing on one scale with its corresponding corrected compass bearing on the other scale; and a straight-edge device having two blades swinging from a common center, said blades being adapted to aline respectively with two adjacent lines, whereby the intersection of said lines is determined, one of said blades being adapted to be swung over said scales about said intersections as a center and when so swung over an uncorrected bearing on one scale will indicate a corresponding corrected compass bearing on the other scale.

4. In a compass course finder, the combination of an annuar compass course diagram having separated outer and inner degree scales having a plurality of lines therebetween, each connecting an uncorrected bearing with its corresponding corrected compass bearing; and a straight edge device having three blades swinging from a common center, each of two of said blades being adapted to aline respectively with two adjacent lines whereby the intersection of said lines is determined, the third of said blades being adapted to be swung about said intersection as a center over said scales and when so swung over an uncorrected bearing on one scale will indicate a corresponding corrected compass bearing on the other scale.

In testimony whereof I have hereunto set my hand.

JOHN R. METCALF.